United States Patent Office

PTO - BOYERS, PA Duty Station

MISSING PAGE TEMPORARY NOTICE

PATENT # 3992X FOR ISSUE DATE 12-24-1824

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # All drawings

Data Conversion Operation

Boyers, Pa

3992X

UNITED STATES PATENT OFFICE.

JAMES Y. HUNT, OF TUNBRIDGE, VERMONT.

PLOW.

Specification forming part of Letters Patent dated December 24, 1824.

*To all whom it may concern:*

Be it known that I, JAMES Y. HUNT, of Tunbridge, Orange county, Vermont, have invented an Improvement in Plows, of which the following is a specification.

The plow, except one handle, may be made as usual, meaning the wood part; the colter, wrought-iron, eighteen inches long, with a swell in the hind part sufficiently large for a gudgeon to be put in three-fourths of an inch, and also a gudgeon-hole in the post behind on the landside, of said dimension. There is to be one landside made of cast or wrought iron, said landside to one and a half inch square, with two shims and mold-boards, made of wood or iron, attached to the same by welding, screwing, or casting. The landside, with its appendages, is to be connected with the colter and said post on the landside by gudgeons three-fourths of an inch diameter, and so constructed that by turning said plow over the shims may be shifted in such a manner by drawing a bolt, which is run through the hind post and supports the shims either way. You may plow, turning the earth all one way, by placing the nigh ox in the furrow one way and the off ox the other way. The plow may be constructed on a greater or smaller scale. The main principle contended for is the turning the plow on the gudgeons.

JAMES Y. HUNT.

Witnesses:

JOEL TINKER,
EPHRAIM HATCH.